(12) United States Patent
Schenk et al.

(10) Patent No.: US 9,486,858 B2
(45) Date of Patent: Nov. 8, 2016

(54) DRILL APPARATUS AND DRILL CHUCK

(71) Applicant: Roehm GmbH, Sontheim/Brenz (DE)

(72) Inventors: Peter Schenk, Niederstotzingen (DE); Patrick Hengsberger, Sontheim/Brenz (DE)

(73) Assignee: Roehm GmbH, Sontheim/Brenz (DE)

( * ) Notice: Subject to any disclaimer, the term of this patent is extended or adjusted under 35 U.S.C. 154(b) by 49 days.

(21) Appl. No.: 14/566,894

(22) Filed: Dec. 11, 2014

(65) Prior Publication Data

US 2015/0158092 A1    Jun. 11, 2015

(30) Foreign Application Priority Data

Dec. 11, 2013    (DE) .................. 10 2013 113 868

(51) Int. Cl.
*B23B 31/12*    (2006.01)

(52) U.S. Cl.
CPC ......... *B23B 31/1207* (2013.01); *B23B 31/123* (2013.01); *B23B 31/1238* (2013.01); *B23B 2231/06* (2013.01); *B23B 2231/38* (2013.01); *B23B 2260/07* (2013.01); *B23B 2260/11* (2013.01); *Y10S 279/902* (2013.01); *Y10T 279/17615* (2015.01); *Y10T 279/17632* (2015.01)

(58) Field of Classification Search
CPC ............ B23B 31/1238; B23B 31/123; B23B 31/1207; B23B 2231/06; B23B 2231/28; B23B 2231/38; B23B 2260/07; B23B 2260/11; B23B 2260/128; Y10T 279/17632; Y10T 279/17623; Y10T 279/17615; Y10T 279/21; Y10T 279/32; Y10T 279/3493; Y10S 279/902

See application file for complete search history.

(56) References Cited

U.S. PATENT DOCUMENTS

| 4,848,779 | A | * | 7/1989 | Wheeler | ............... | B23B 31/123 |
| | | | | | | 279/60 |
| 5,072,954 | A | * | 12/1991 | Mack | ..................... | B23B 31/00 |
| | | | | | | 279/126 |
| 6,488,287 | B2 | * | 12/2002 | Gaddis | .................. | B23B 31/123 |
| | | | | | | 279/150 |

(Continued)

FOREIGN PATENT DOCUMENTS

| DE | 9320006 U1 | * | 2/1994 | .......... B23B 31/001 |
| DE | 10 2011 002 331 A1 | | 10/2012 | |

OTHER PUBLICATIONS

Machine translation, German patent document, DE 9320006 U1, "Chuck with dust cap", Roehm, G., Feb. 10, 1994.*

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A drill chuck and a drill apparatus is provided that includes a drilling machine, which has a motor and a machine spindle that is supported in rotary fashion in a machine housing. The a drill chuck is connected to the machine spindle and can be moved between a clamping configuration and a drilling configuration and has a clamping sleeve and a chuck body in which clamping jaws are movably guided by a threaded connection. When a sliding sleeve is moved relative to the chuck body between a first position that corresponds to the clamping configuration and a second position that corresponds to the drilling configuration, a flow of force traveling from the motor via the machine spindle to the threaded connection is shifted to a flow of force traveling from the motor via the machine spindle to the chuck body and vice versa.

15 Claims, 9 Drawing Sheets

(56) References Cited

U.S. PATENT DOCUMENTS

| | | | | |
|---|---|---|---|---|
| 7,806,636 B2 * | 10/2010 | Puzio | ............... | B23B 31/123 279/140 |
| 2006/0202435 A1 * | 9/2006 | Rohm | ............ | B23B 31/1238 279/62 |
| 2006/0232022 A1 * | 10/2006 | Nickels, Jr. | ......... | B23B 31/1238 279/60 |
| 2007/0235952 A1 * | 10/2007 | Mack | ................ | B23B 31/123 279/62 |
| 2012/0274035 A1 | 11/2012 | Schenk | | |

* cited by examiner

DRILL APPARATUS AND DRILL CHUCK

This nonprovisional application claims priority to German Patent Application No. DE 10 2013 113 868.3, which was filed in Germany on Dec. 11, 2013, and which is herein incorporated by reference.

BACKGROUND OF THE INVENTION

Field of the Invention

The present invention relates to a drill apparatus, including a drilling machine, which includes a motor and has a machine spindle that is supported in rotary fashion in a machine housing, and relates to a drill chuck, which is connected to the machine spindle and can be moved between a clamping configuration and a drilling configuration, having a clamping sleeve and a chuck body in which clamping jaws are movably guided by means of a threaded connection.

The invention also relates to a drill chuck for a drill apparatus that has a machine spindle and can be moved between a clamping configuration and a drilling configuration and has a clamping sleeve in a chuck body in which clamping jaws are movably guided by means of a threaded connection.

Description of the Background Art

A drill apparatus of this kind and a drill chuck of this kind are known from DE 10 2011 002 331 A1, which corresponds to US 20120274035, in which the drill chuck can be moved between a clamping configuration and a drilling configuration. In this case, a switch ring is used, which moves the machine spindle situated inside the chuck body axially relative to the chuck body of the drill chuck. In this embodiment, a large bearing diameter is required at the machine end and the mechanical attachment to the drilling machine is very complex.

SUMMARY OF THE INVENTION

It is therefore an object of the present invention to provide a drill apparatus and a drill chuck, which have a simplified design and a simplified integration of the drill chuck into the drilling machine.

The object relating to the drill apparatus is attained in a drill apparatus in that the chuck body of the drill chuck is supported on a machine spindle in rotary fashion and when a sliding sleeve is moved relative to the chuck body, between a first position that corresponds to the clamping configuration and a second position that corresponds to the drilling configuration, a flow of force traveling from the motor via the machine spindle to the threaded connection is shifted to a flow of force traveling from the motor via the machine spindle to the chuck body and vice versa.

Consequently, the drill chuck is not, as is usually the case, connected to the machine spindle of the drilling machine in a rotationally fixed fashion; instead, the drill chuck is supported on the machine spindle in a rotary fashion. This enables a relative rotation of the chuck body in relation to the machine spindle. In order to move the drill chuck between the clamping configuration and the drilling configuration, it is now no longer necessary to actuate or use an additional adjusting sleeve—situated coaxially outside the drill chuck—in order to axially move the machine spindle relative to the chuck body of the drill chuck. Instead, it is now possible to switch the drill chuck between a clamping configuration and a drilling configuration by moving the clamping sleeve with the sliding sleeve.

In an embodiment, the sliding sleeve is connected to the chuck body in an axially, rotationally fixed fashion and is supported so that it can move axially relative to it. As a result, the sliding sleeve can transmit a force that is transmitted to it—in particular a driving force or a holding force—directly to the chuck body.

It has turned out to be preferable if the sliding sleeve is axially secured to the clamping sleeve and in the first position, is rotationally fixed while in the second position, it is supported so that it is able to rotate relative to the machine housing. The first position corresponds to the clamping configuration in which the chuck body is secured to prevent it from rotating relative to the machine housing. It is thus possible to ensure that a holding force originating from the machine housing can act on the chuck body via the sliding sleeve. In this clamping configuration, the machine spindle can rotate relative to the chuck body, thus driving the threaded connection in order to move the clamping jaws. Conversely, this ensures that in the second position, the sliding sleeve secures the chuck body to prevent it from rotating relative to the machine spindle. The axial securing of the sliding sleeve on the clamping sleeve has the advantage that it enables a movement of the sliding sleeve relative to the chuck body.

In order to make a relative rotation of the machine spindle in regard to the chuck body more operationally reliable, it has also turned out to be preferable if the sliding sleeve is supported on the chuck body in a radially form-fitting fashion and the clamping sleeve has two detent positions.

It is also advantageous if the sliding sleeve has at least one first component for producing a rotationally fixed coupling with at least one corresponding first coupling element of the machine housing. The first component for producing a rotationally fixed coupling is able to support the sliding sleeve in the first position in a simple way so that it is rotationally fixed relative to the machine housing.

It has also turned out to be advantageous if the sliding sleeve has at least one second component for producing a rotationally fixed coupling with at least one corresponding second coupling element of the machine spindle. This second component for producing a rotationally fixed coupling produces a rotationally fixed connection of the machine spindle to the sliding sleeve in the drilling configuration in which the force coming from the machine spindle can be transmitted to the sliding sleeve and from there to the chuck body.

It is also advantageous if the chuck body has at least one first detent seat corresponding to the clamping configuration and at least one second detent seat corresponding to the drilling configuration, if a control cam is situated between the first and second detent seats, and if the clamping sleeve has at least one detent element that corresponds to the detent seats. The different switch positions of the drill apparatus are implemented in this way. The control cam corresponds to the switching device of the clamping sleeve of the drill chuck. The control cam can be embodied as ascending, but does not have to be.

It has also turned out to be preferable that a roller bearing or slide bearing is provided for supporting the chuck body on the machine spindle in rotary fashion. In a preferred embodiment, the roller bearing is embodied in the form of a needle bearing, which has the advantage that it can be embodied in a very thin and compact way.

In another embodiment, the threaded connection is composed of a clamping thread of the clamping jaws, which are embodied in the form of round jaws, and a threaded ring that engages with the clamping thread. An integrated round-jawed drill chuck is thus achieved.

In this connection, it has also turned out to be advantageous if a planetary gear is situated between the threaded ring and the machine spindle. According to another embodiment, this planetary gear is composed of a ring gear connected to the threaded ring in a rotationally fixed fashion, at least one planet gear situated in the chuck body in rotary fashion, and a sun gear supported on the machine spindle in a rotationally fixed fashion. The use of a planetary gear makes the drill chuck very compact and has the advantage that the input and output shafts are aligned with each other, i.e. lie along a common axis.

In order to support the sliding sleeve during the switching between the first position and the second position, it has turned out to be advantageous if the clamping sleeve, on its side oriented away from the machine spindle, is axially supported by a spring element. During the movement of the sliding sleeve, the sliding sleeve, which is guided on the chuck body in a rotationally fixed fashion, is moved in the axial direction between the first and second positions.

The axial support of the clamping sleeve can be implemented in the form of a support ring that is acted on by the spring element. This support ring distributes the spring force of the spring element uniformly and in the shape of a ring to the end surface of the clamping sleeve oriented away from the machine spindle.

It has also turned out to be advantageous if on the side of the chuck body oriented away from the machine spindle, a protective cap is provided, which has an annular collar that is recessed—at least in the drilling configuration—into an annular recess of the clamping sleeve. This protective cap covers the clamping sleeve in both switch configurations. In one advantageous embodiment, it is supported in rotary fashion on the chuck body. The protective cap on the one hand protects the drill chuck when during the drilling operation, the drill bit or drilling tool penetrates too deeply into the material to be machined and the material to be machined leaves scrape marks on the chuck body due to the rotational movement. On the other hand, the material to be machined is protected from the turning, i.e. rotating, components of the drill chuck, because when the drill bit or drilling tool penetrates too far, the rotatable protective cap remains stationary against the material to the machined and then the chuck body and the clamping sleeve can rotate relative to the protective cap.

It is also advantageous if a sensor is provided, which sends a signal to the drilling machine as soon as the clamping sleeve is in the first position. A signal is therefore generated that communicates when and whether the drill apparatus is in the drilling configuration. To this end, a switch disk is advantageously provided, which is situated on the side of the clamping sleeve oriented toward the machine spindle. The distance from the switch disk can be measured by a distance transducer that is preferably associated with the drilling machine.

Naturally, the sensor can also be situated on the drill chuck and the switch disk can be situated on the machine housing.

It also turns out to be advantageous if at least one component is provided for adjusting the switching torque. The switching torque is the torque required to switch the drill chuck and the drill apparatus between the clamping configuration and the drilling configuration. The v for adjusting the switching torque can be used to vary the switching torque.

It has also turned out to be advantageous to limit the clamping force. This can be implemented by, for example, a slip clutch. This clutch can be situated axially or radially relative to the chuck body. In addition, when the clamping sleeve is moved, a switch in the machine housing can be actuated, which signals the drilling machine that the drill apparatus is now in the clamping mode. In this case, it is possible to carry out the clamping of the drill bit or drilling tool while carrying out a simultaneous measurement of the motor current, which is proportional to the torque acting on the clamping jaws and can be used as a basis for calculating the clamping force. The variation of the motor current can also be used to vary the clamping force acting on the drilling tool.

The object relating to the drill chuck is attained in a drill chuck of the type mentioned at the beginning, which, when a sliding sleeve is moved relative to the chuck body between a first position that corresponds to the clamping configuration and a second position that corresponds to the drilling configuration, a flow of force traveling from the machine spindle to the threaded connection is shifted to a flow of force traveling from the machine spindle to the chuck body and vice versa.

This is also connected with the advantage that it is possible to change the flow of force inside the drill chuck in a simple way, namely by moving the clamping sleeve.

An embodiment of the drill chuck according to the invention is characterized in that an impact mechanism for impact drilling is provided. By means of this, it is now possible, in addition to a pure rotary or drilling movement, to also execute a hammering or vibrating axial movement in a drill chuck that is integrated into the drilling machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
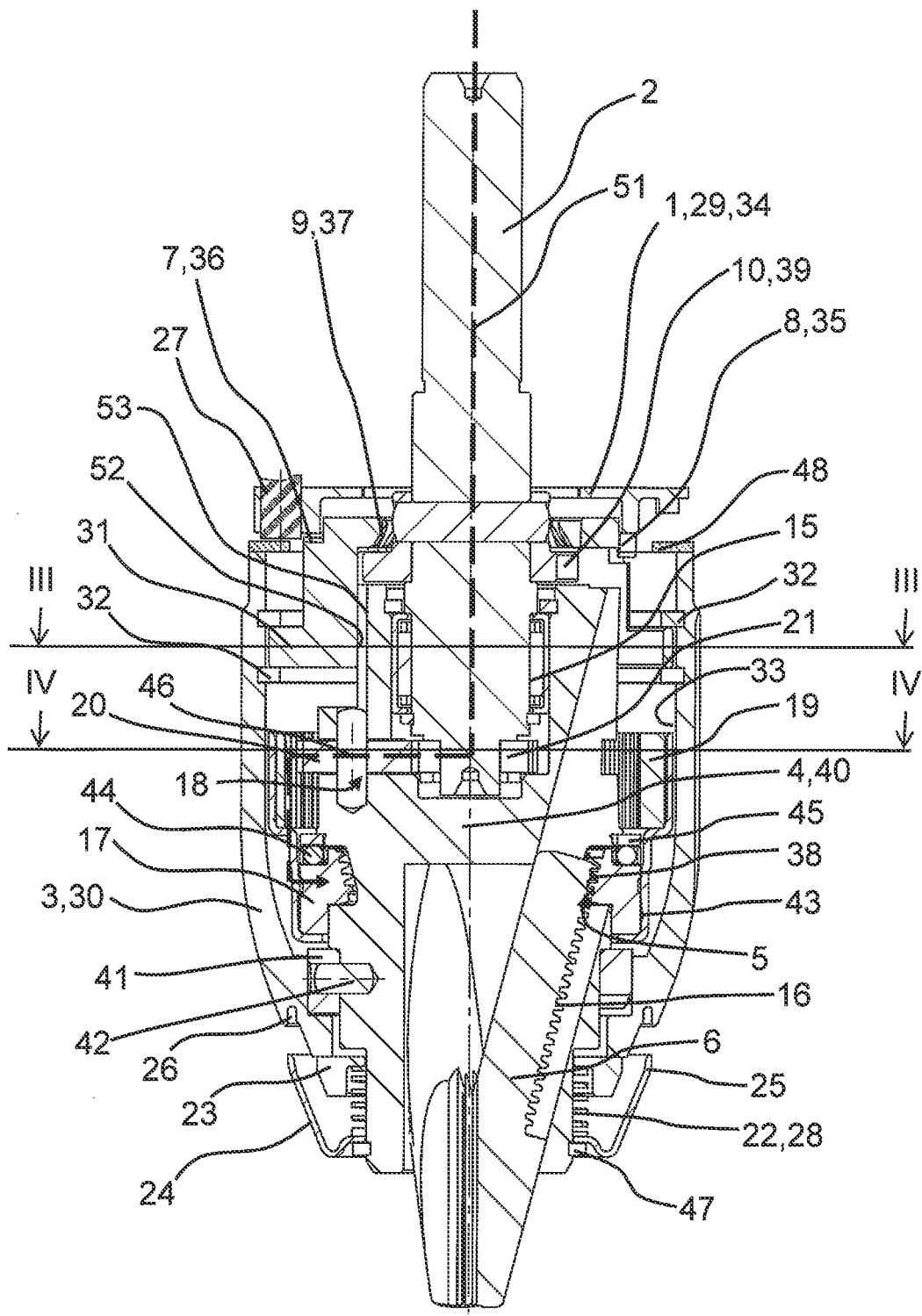
FIG. 1 shows a longitudinal section through a drill apparatus according to the invention, in a first embodiment situated in the clamping configuration.

In order to simplify the explanation of the invention, the figures have been reduced to the components that are relevant to the invention. It is therefore unnecessary to provide an illustration of a whole drilling machine with a motor. The figures show a front part 29 of a machine housing 1 oriented toward the drill chuck and a machine spindle 2 of the drilling machine. The drawings also show a drill chuck that is attached to the machine spindle 2.

The drill chuck is a round-jawed drill chuck with clamping jaws 6, which are movably guided in guides of the chuck body that are inclined relative to the chuck axis. The clamping jaws 6 thus form a socket between themselves for a drill bit or drilling tool. In order to adjust the clamping jaws 6, a threaded ring 17 is supported in rotary fashion coaxial to the chuck body 4 of the drill chuck and, with its thread 38, engages a clamping thread 16 of the clamping jaws 6. When the threaded ring 17 is rotated relative to the chuck body 4, this causes the clamping jaws 6 to clamp or release, depending on the rotation direction of the threaded ring 17.

Figure 5:
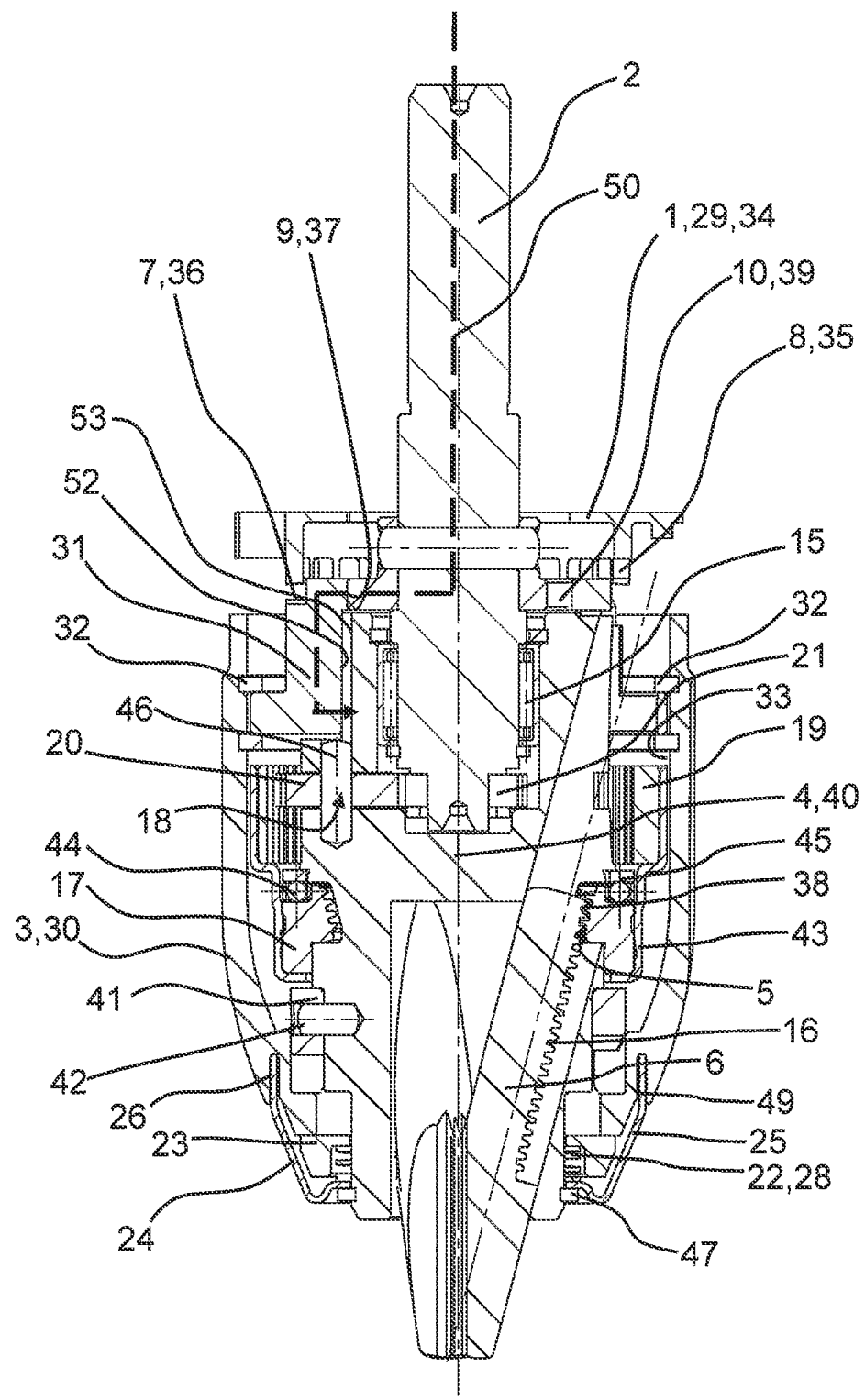
FIG. 5 shows a section through another embodiment in the drilling configuration.
Figure 6:
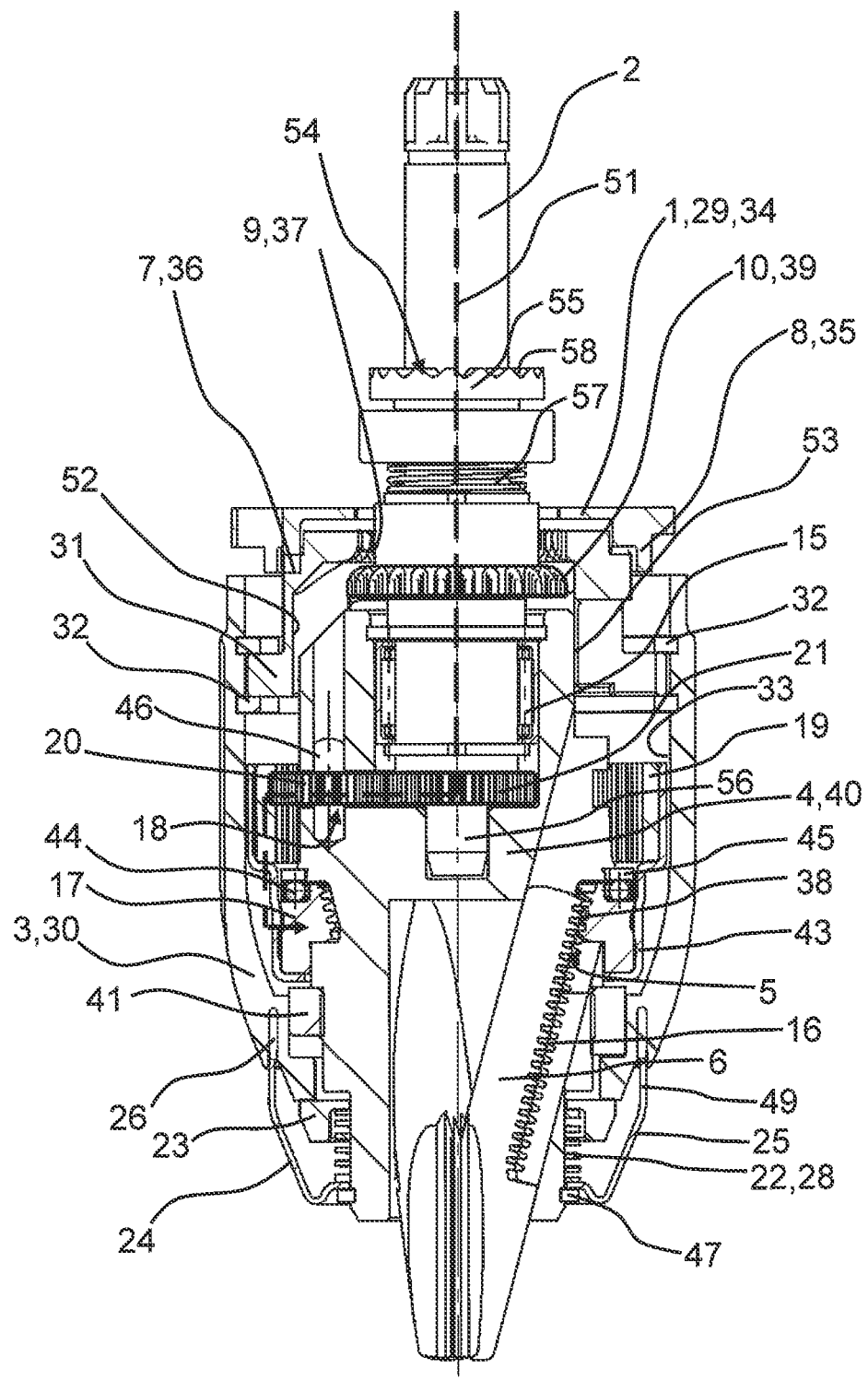
FIG. 6 shows a section through another embodiment in the clamping configuration.
Figure 7:
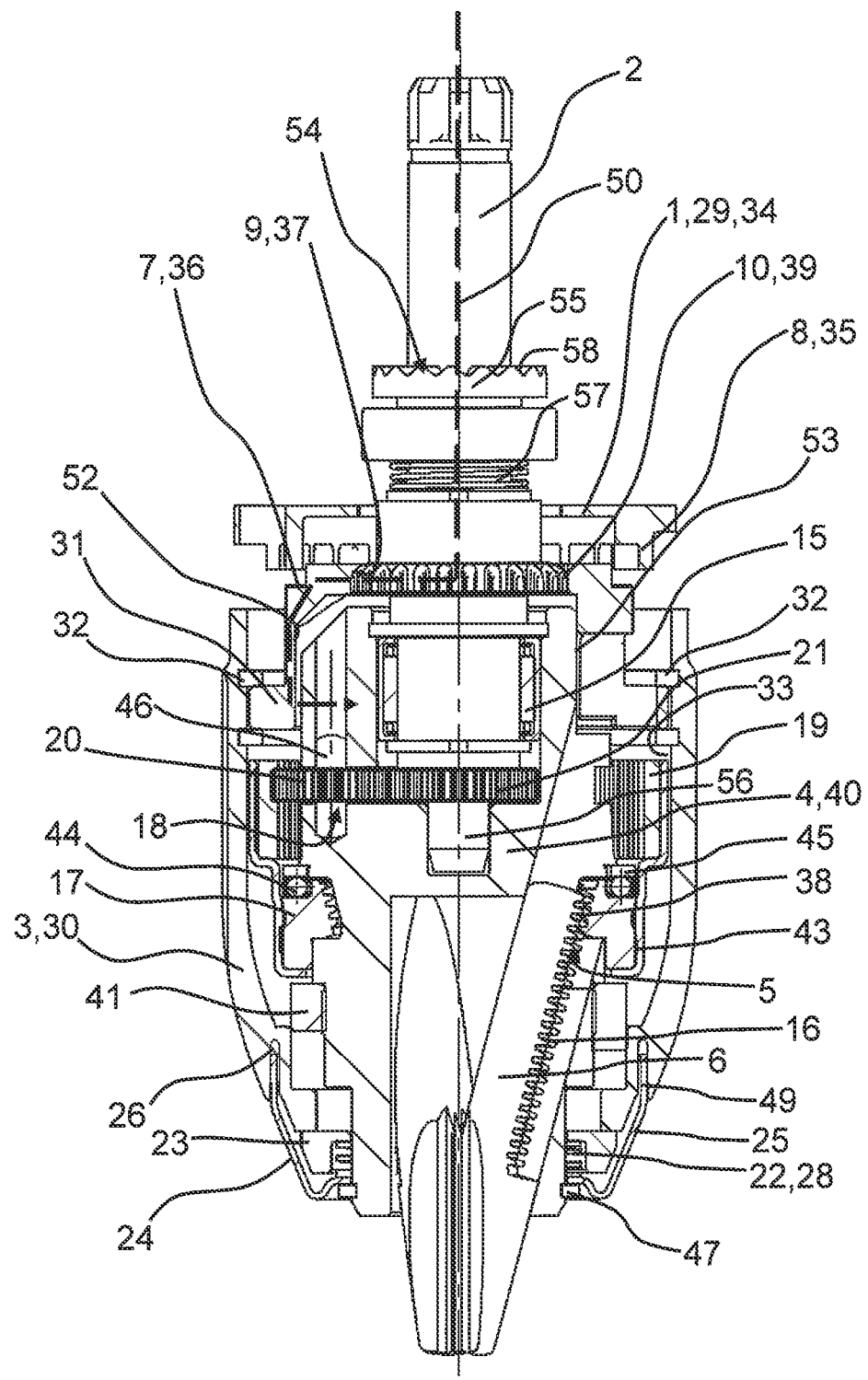
FIG. 7 shows a section through the embodiment according to FIG. 6 in the drilling configuration.
Figure 8:
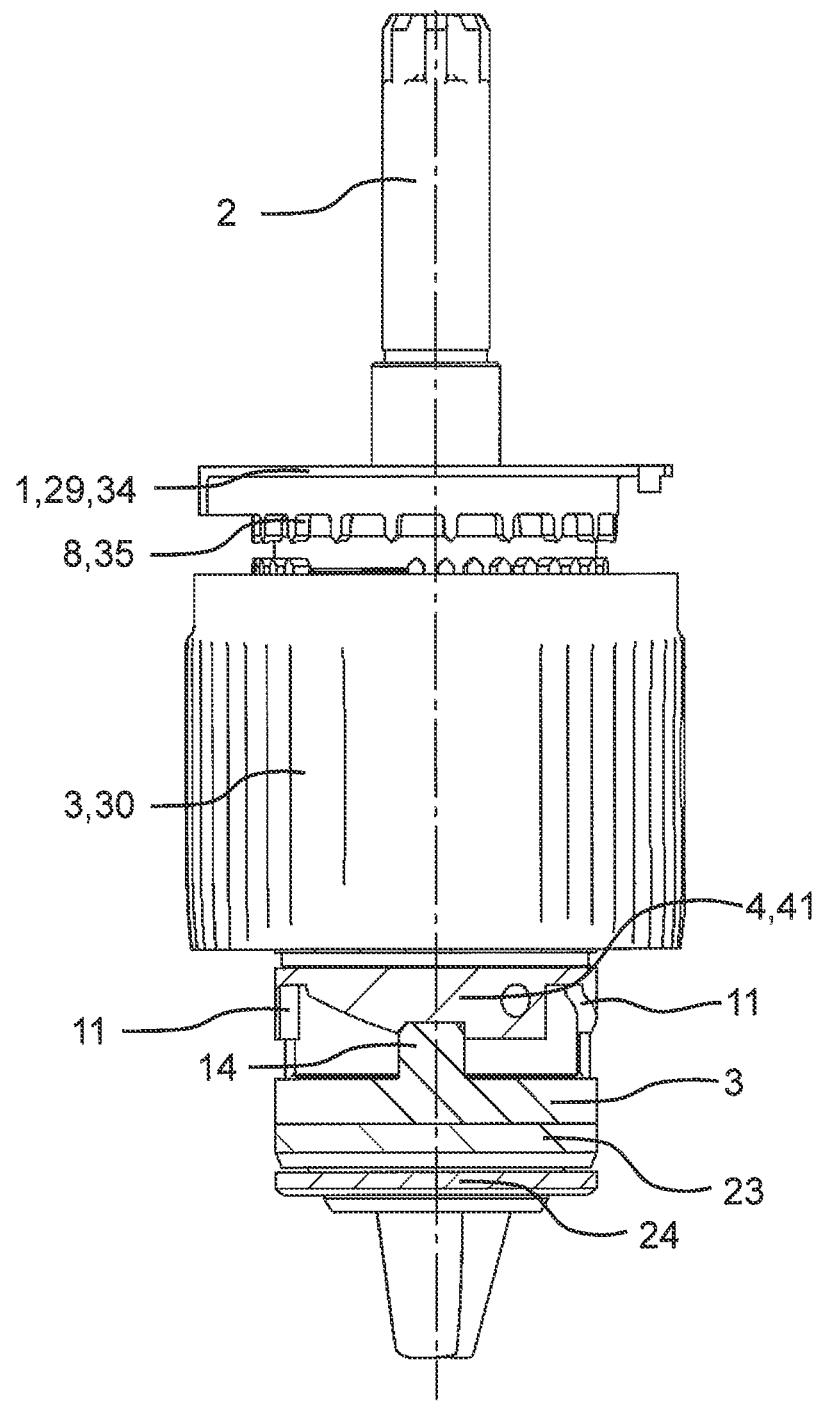
FIG. 8 shows a partially sectional side view of an embodiment shown in the clamping configuration.
Figure 9:
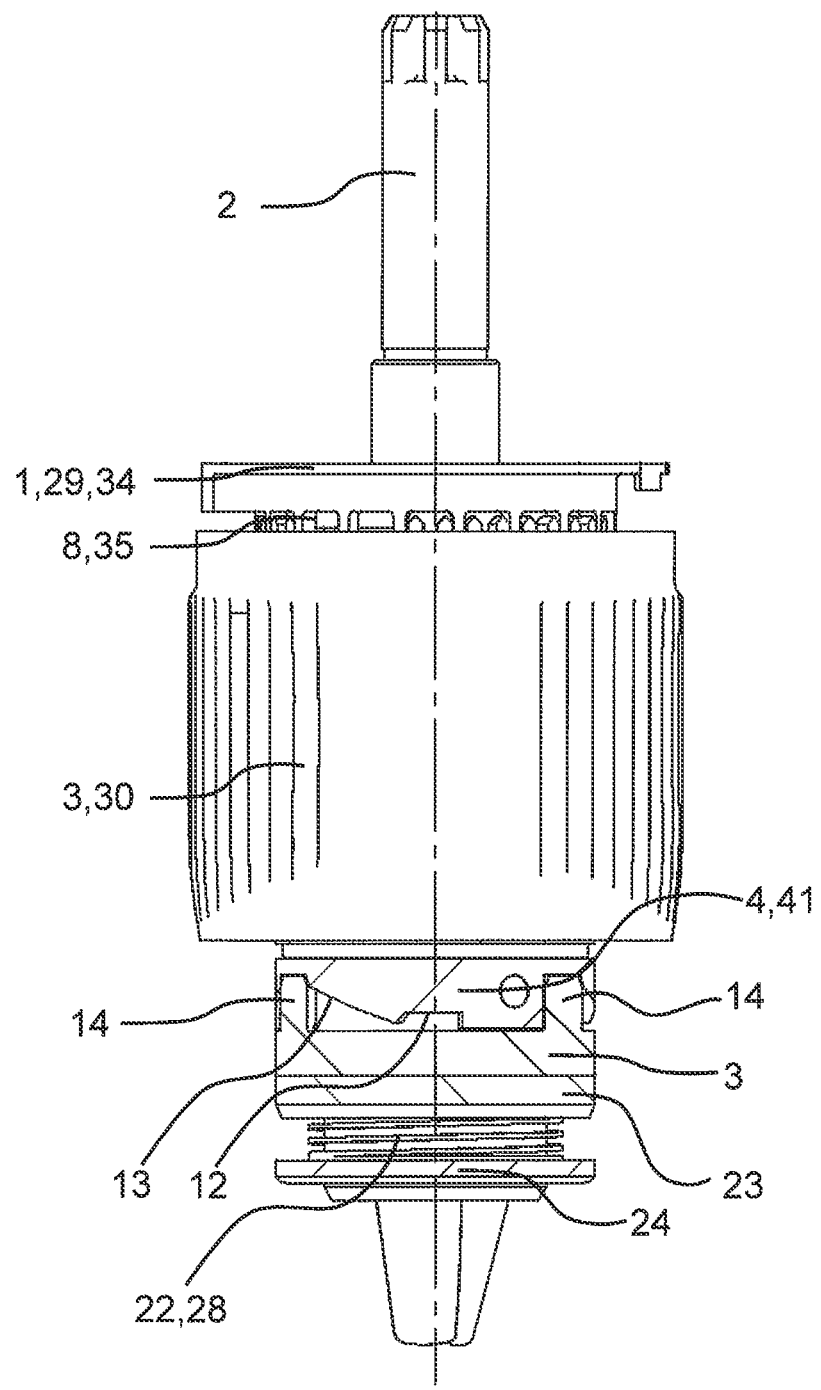
FIG. 9 shows a partially sectional view of the embodiment according to FIG. 8 in the drilling configuration.
Figure 10:
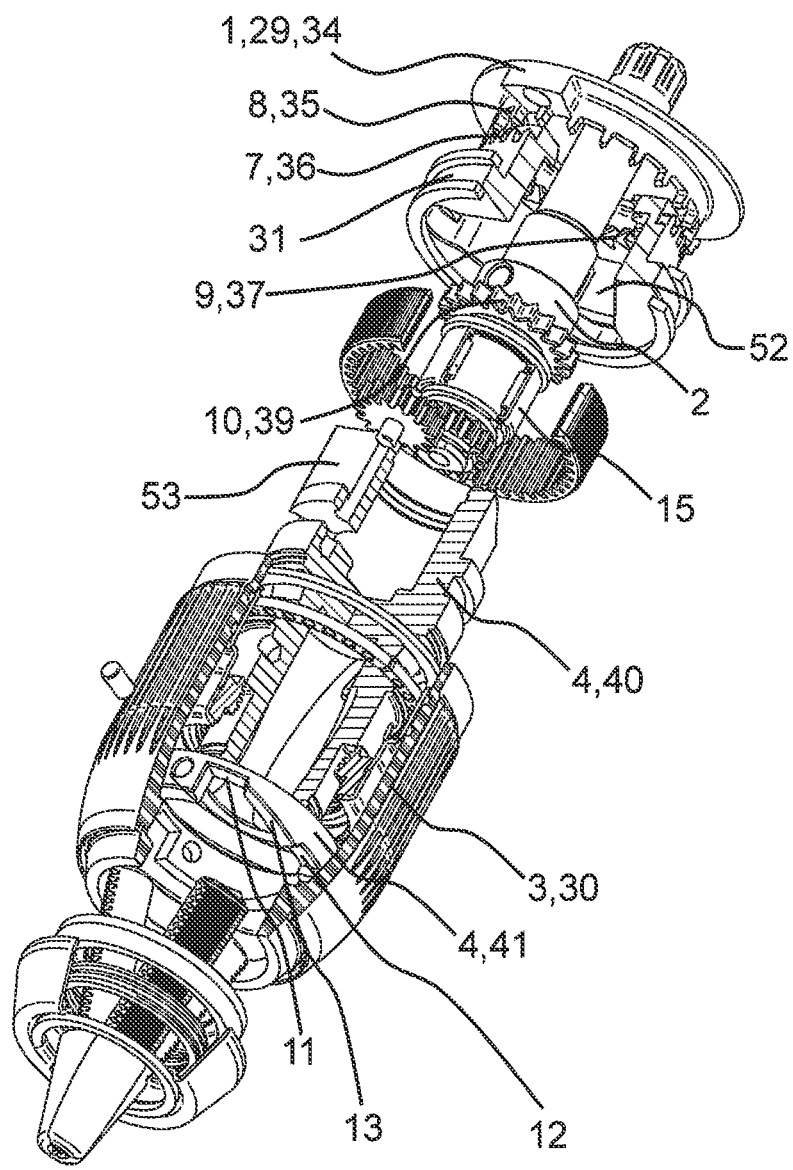
FIG. 10 shows an exploded, partially sectional view of the drill apparatus from FIG. 1

The chuck body 4 of the drill chuck is supported on the machine spindle 2 in rotary fashion. When a sliding sleeve 31 is moved relative to the chuck body 4 between a first position that corresponds to the clamping configuration (FIG. 1; FIG. 6; FIG. 8) and a second position that corresponds to the drilling configuration (FIG. 2; FIG. 5; FIG. 7; FIG. 9), a flow of force 15 traveling from the motor via the machine spindle 2 to the threaded connection 5 is shifted to a flow force of force 50 traveling from the motor via the machine spindle 2 to the chuck body 4 and vice versa.

The clamping sleeve 3 is connected to a sliding sleeve 31 by means of a casing part 30. In order to axially secure the sliding sleeve 31 relative to the casing part 30, securing rings 32 are provided, which are situated against the inner wall 33 of the clamping sleeve 3. Consequently when the clamping sleeve 3 is moved axially, the sliding sleeve 31 moves axially as well. Conversely, a machine part of the drilling machine can also be provided, which moves the sliding sleeve axially on the chuck body 4 in order to switch it between the first position and the second position. In one particular embodiment, the sliding sleeve can also be embodied in one piece with the casing part 30.

The sliding sleeve 31 is supported on the chuck body 4 in a rotationally fixed fashion. The rotationally fixed support is implemented by means of a form-fitting engagement of the non-round cross-section of the sliding sleeve 31 and the non-round cross-section of the chuck body 4. In the exemplary embodiment, the rotationally fixed support is comprised of a first locking surface 52 associated with the sliding sleeve 31 and a corresponding second locking surface 53 associated with the chuck body 4. The non-round cross-sections and locking surfaces 52 and 53 are shown in FIGS. 3 and 7.

Figure 2:
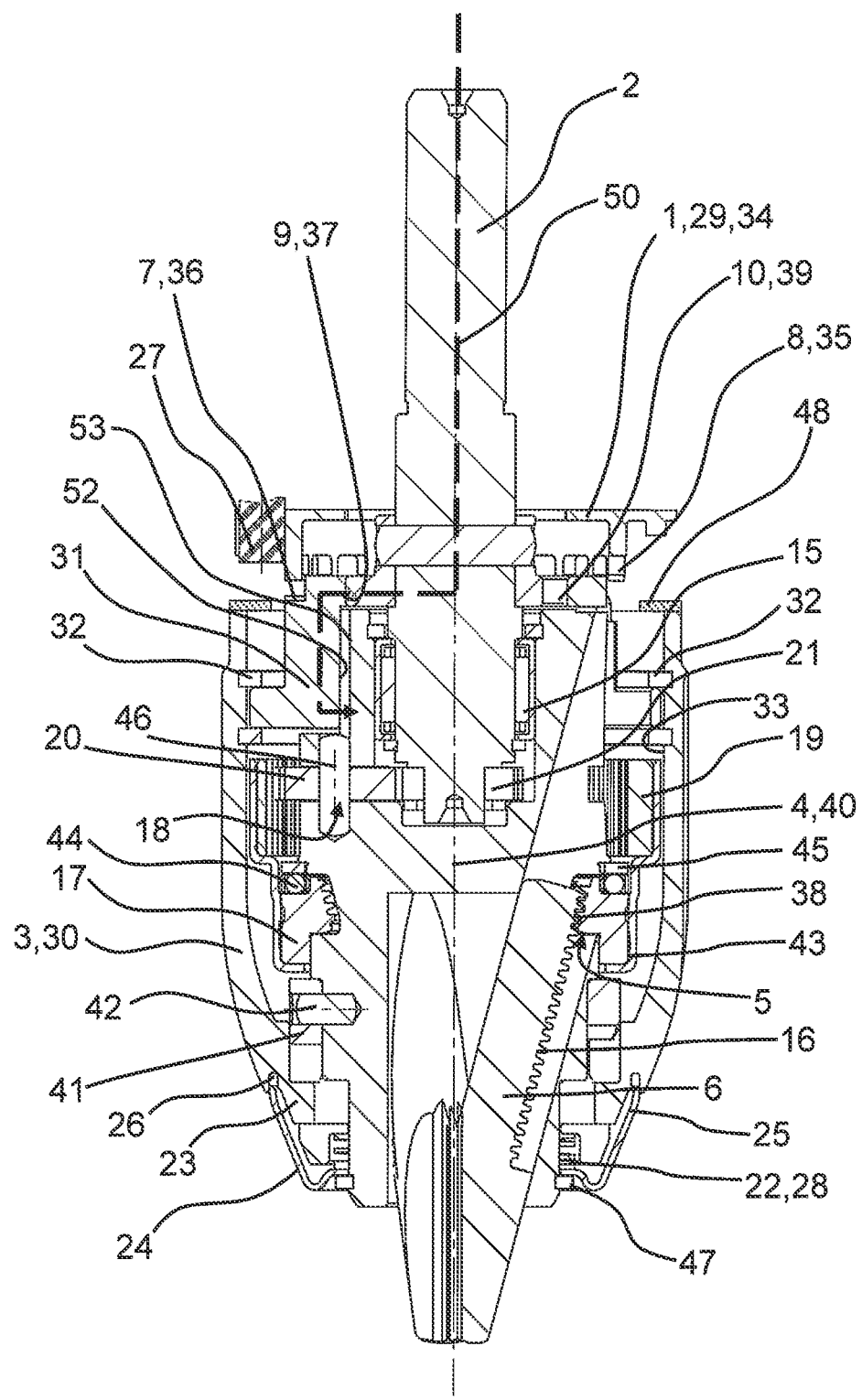
FIG. 2 shows the drill apparatus from FIG. 1 in the drilling configuration.
Figure 3:
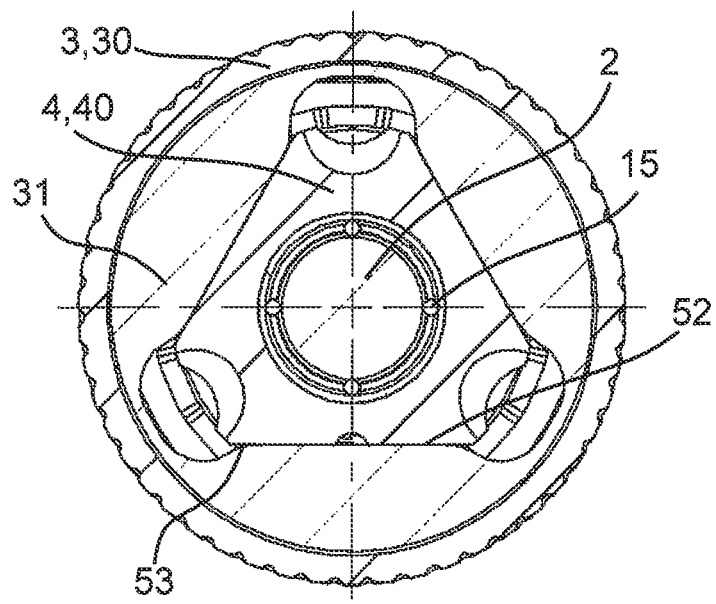
FIG. 3 shows section III-III from FIG. 1.

In FIG. 3, it is clear that in the exemplary embodiment shown, there are exactly three first locking surfaces 52 and exactly three corresponding second locking surfaces 53. It is also possible to use a different number of locking surfaces 52, 53 here in order to transmit a force acting on the sliding sleeve 31 to the chuck body 4. In the present instance, the first and second locking surfaces 52, 53 are situated at an angle between 30 and 80 degrees to each other, in this case exactly 60 degrees. They are axially situated at the level of the guides of the clamping jaws 6 (e.g. shown on the right side in FIGS. 1 and 2), which has advantages from a production standpoint, e.g. a reduction in the processing time for the chuck body 4.

The sliding sleeve 31 has first indent 7 for producing a rotationally fixed coupling with corresponding first coupling elements 10 of the machine housing 1. In the exemplary embodiments shown, the machine housing has an anti-rotation lock 34 with a first coupling element 8 embodied in the form of a securing denticulation 35 that can be engaged by the first indent 7 for producing a rotationally fixed coupling, which is associated with the sliding sleeve 31 and embodied in the form of a first counterpart denticulation 36.

The sliding sleeve 31 also has a second indent 9 for producing a rotationally fixed coupling, with corresponding second coupling elements 10 of the machine spindle 2. The second indent 9 for producing a rotationally fixed coupling, which are associated with the sliding sleeve 31 and embodied in the form of a second counterpart denticulation 37, can engage with the corresponding second coupling elements 10 of the machine spindle 2 embodied in the form of a locking denticulation 39.

In the exemplary embodiment shown, the chuck body 4 has three first detent seats 11 that correspond to the clamping configuration and three second detent seats 12 that correspond to the drilling configuration. The sliding sleeve 31 also has three detent elements 14 that correspond to the detent seats 11, 12 of the chuck body 4. Here, too, it is possible for there to be a different number of detent seats 11, 12 and detent elements 14. The matching number of detent seats 11, 12 can be different from the number of detent elements 14 so that there can also be fewer detent elements 14 than detent seats 11, 12. According to the preferred embodiment, control cams 13 are situated between the first detent seats 11 and second detent seats 12. In the exemplary embodiment shown, the chuck body 4, for assembly reasons, is composed of multiple parts: a central body 40 and a body switch ring 41 connected to the central body 40 in a rotationally fixed fashion. According to the embodiment shown, the first detent seat 11, the second detent seat 12, and the control cams 13 are situated on this body switch ring 41. In this instance, the rotationally fixed connection is provided between the central body 40 and the body switch ring 41 and in the exemplary embodiment shown, is embodied in the form of a plurality of securing pins 42. In order to reduce the weight of the drill chuck, this body switch ring 41 can be composed of a soft and/or lightweight material, preferably a plastic. In the embodiments shown, a roller bearing 15 embodied in the form of a needle bearing is provided for supporting the chuck body 4 in rotary fashion on the machine spindle 2. Other types of bearings such as slide bearings, ball bearings, roller bearings, etc. can also be used.

The threaded connection 5 is composed of a clamping thread 16, the clamping jaws 6 embodied as round jaws, and a threaded ring 17 that engages with the clamping thread 16. The threaded ring 17 engages by means of a thread 38 with the clamping threads 16 of the clamping jaws 6 and is also connected to a driver sleeve 43 in a rotationally fixed fashion. On the side of the threaded ring 17 oriented toward the machine spindle 2, another roller bearing 44 is provided. On the side of the roller bearing 44 oriented toward the machine spindle 2, a pressure ring 45 is provided, which is in turn supported on the chuck body 4.

Figure 4:
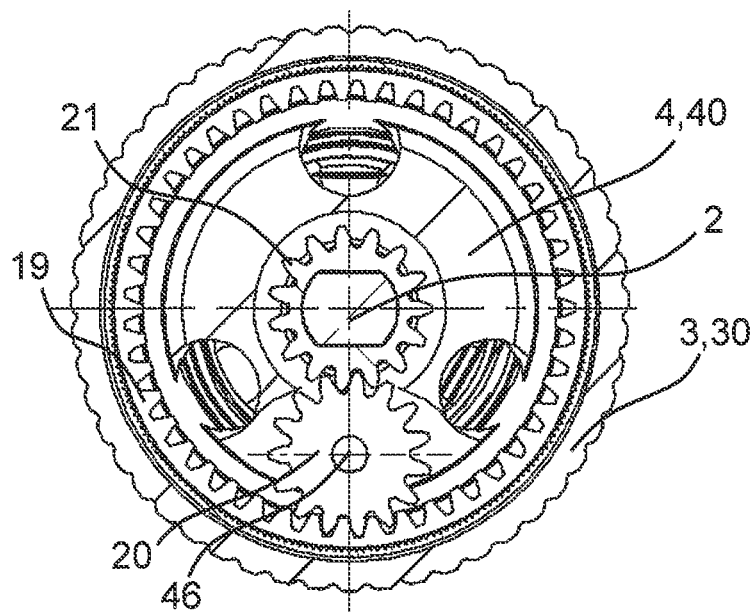
FIG. 4 shows section IV-IV from FIG. 1.

Between the threaded ring 17 and the machine spindle 2, a planetary gear 18 is provided. The planetary gear 18 includes a ring gear 19 to the threaded ring 17 in a rotationally fixed fashion, exactly one planet gear 20—in the present exemplary embodiment according to FIG. 4—situated on a bearing axis 46 oriented parallel to the longitudinal axis of the drill chuck, and a sun gear 21 supported on the machine spindle 2 in a rotationally fixed fashion. It is also possible for there to be embodiments in which more than just one planet gear 20 is used. For example, it has turned out to be advantageous to use three or four planet gears. The invention, however, can also be embodied with any other arbitrary number of planet gears 20. According to the preferred exemplary embodiment, the ring gear 19 is press-fitted into the driver sleeve 43; it is also possible for the ring gear 19 and driver sleeve 43 to be embodied as one piece. This is implemented, for example, by means of a deep-drawn sheet with a denticulation. The sun gear 21 is press-fitted onto the machine spindle 2. The sun gear 21 can nevertheless also be embodied as integral to the machine spindle 2.

On its side oriented away from the machine spindle 2, the clamping sleeve 3 is axially supported by a spring element 22. Also to axially support the clamping sleeve 3, a support ring 23 is provided, which is acted on by the spring element 22. The spring element 22 in turn is axially supported indirectly or directly against the side of the chuck body 4 oriented away from the machine spindle 2. In the present instance, a snap ring 47 is provided on the side of the chuck body 4 oriented away from the machine spindle 2 supporting a protective cap 24, which has an annular collar 25 that is recessed—at least in the drilling configuration—into an annular recess 26 of the clamping sleeve 3. According to the embodiment shown in FIGS. 1 and 2, a sensor 27 is provided, which sends a signal to the drilling machine as soon as the clamping sleeve 3 is in the first position, which corresponds to the clamping configuration. In the exemplary embodiment shown, this is implemented by means of a switch disk 48 situated on the side of the clamping sleeve 3 oriented toward the machine spindle 2.

According to another preferred embodiment shown in FIGS. 5 and 6, the annular collar 25 of the protective cap 24 has an engaging section 49, which is oriented toward the machine spindle 2 and recessed in a corresponding annular recess 26 of the clamping sleeve 3. According to this preferred embodiment, the engaging section 49 is recessed in the annular recess 26 of the clamping sleeve 3 in both the clamping configuration and the drilling configuration. This has the advantage that no excessive gap or no gap at all is produced when the clamping sleeve 3 is axially retracted. Finally, in all of the exemplary embodiments shown, the spring element 22 facilitates adjustment of the switching torque.

According to the advantageous embodiment in FIGS. 6 and 7, the drill apparatus and the drill chuck are equipped with an impact mechanism 54. The impact mechanism makes it possible, in addition to the pure rotary movement of the drill chuck on the machine spindle 2, to also execute a vibration-like movement in the axial direction, which makes it possible to machine particularly hard materials. The impact mechanism 54 includes an impact spring 57, which is supported against an impact plate 55 and pushes the impact plate 55 axially toward the machine housing 1. The impact plate 55 interacts with a structure embodied on the drilling machine. In an alternative embodiment, this structure is likewise embodied on a machine impact plate situated opposite the impact plate 55. For the interaction with the machine impact plate, the impact plate provides an uneven end surface 58, which in the exemplary embodiment shown, is embodied in the form of a wave-shaped denticulation. When the impact plate 55 is moved axially toward the front, then in the drilling configuration (FIG. 7), the machine spindle 2 is likewise moved axially via a driver. The axial movement of the machine spindle 2 then permits an impact drilling because the axial movement of the machine spindle simultaneously produces an axial movement of the drill chuck. In the clamping configuration (FIG. 6), however, the machine spindle 2 is axially immobilized so that it is not possible for the machine spindle 2 and the drill chuck to move along their longitudinal axis. In other words, the impact mechanism 54 is deactivated in the clamping configuration.

The drill apparatus and drill chuck will be explained below in the operation of the drilling configuration, the changeover of their operating mode, and in the operation of the clamping configuration.

FIGS. 2, 5, 7, and 9 show drill apparatuses and drill chucks in the drilling configuration. The sliding sleeve 31 is situated in the second position in which it has been moved axially forward relative to the chuck body 4, i.e. in a direction away from the machine spindle 2. The detent elements 14 have engaged in the second detent seats 12 (FIG. 9). In this case, the second counterpart denticulation 37 of the sliding sleeve 31 engages with the locking denticulation 39 of the machine spindle 2. In other words, the machine spindle 2 is connected to the sliding sleeve 31 in a rotationally fixed fashion. The sliding sleeve 31 is connected to the chuck body 4 in a rotationally fixed fashion by means of the first locking surface 52 and the second locking surface 53.

Consequently, the flow of force 50 of the drilling configuration travels from the motor via the machine spindle 2, to the sliding sleeve 31, via the first and second locking surfaces 52 and 53, to the chuck body 4. At the same time, there is no relative rotation of the sun gear 21 in relation to the planet gear 20 situated in the chuck body 4 as a result of which, there can likewise be no relative rotation of the threaded ring 17 in relation to the chuck body 4. Consequently, the drill chuck as a whole rotates with the rotation speed of the machine spindle 2.

In order to then be able to move the drill chuck into the clamping configuration according to FIGS. 1, 6, and 9, the clamping sleeve 3 must be rotated radially in opposition to the force of the spring element 22. As a result, the detent elements 14 of the clamping sleeve 3 are released from the second detent seats 12 of the chuck body 4. As the clamping sleeve 3 is rotated further relative to the chuck body 4, the detent element 14 is slid along the control cam 13 in the direction of the first detent seat 11. As soon as the detent element 14 has engaged in the first detent seat 11 (FIG. 8), the clamping sleeve 3 is axially offset toward the rear relative to the chuck body 4, i.e. in the direction toward the machine spindle 2. The clamping sleeve 3 is now in the first position. The drill apparatus and drill chuck have arrived in the clamping configuration. In order to move into the drilling configuration, the above sequence must be carried out in reverse order.

In the clamping configuration, the securing denticulation 35 of the anti-rotation lock 34 of the machine housing 1 engages with the counterpart denticulation 36 of the sliding sleeve 31. The engagement of the denticulation supports the sliding sleeve 31 in a rotationally fixed fashion relative to the machine housing 1. The sliding sleeve 31 is nevertheless connected to the chuck body 4 in a rotationally fixed fashion via the first and second locking surfaces 52 and 53. In other words, the machine housing 1 holds the sliding sleeve 31, which prevents the chuck body 4 from rotating by means of the machine spindle 2.

Consequently, the flow of force 51 of the clamping configuration travels from the motor via the machine spindle 2 to the planet gear 20 of the planetary gear 18. Because the chuck body 4 is secured to prevent it from rotating, the ring gear 19 of the planetary gear 18 rotates and thus drives the threaded ring 17. In the embodiments shown, the ring gear 19 and the threaded ring 17 are connected in a rotationally fixed fashion by means of a driver sleeve 43. The relative rotation of the threaded ring 17 in relation to the chuck body 4 causes a movement of the clamping jaws 6 that are engaged by the threaded ring 17. The relative rotation of the machine spindle 2 in relation to the chuck body 4 is enabled by the needle bearing that is situated on the machine spindle 2, coaxial to the longitudinal chuck axis of the drill chuck.

In order to permit a clamping and releasing, the motor has two rotation directions or directions of travel (clockwise rotation and counterclockwise rotation), as is sufficiently known from the prior art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drill apparatus including a drilling machine, the drill apparatus comprising:
   a motor and a machine spindle that is supported in rotary fashion in a machine housing;
   a drill chuck connected to the machine spindle and is adapted to be moved between a clamping configuration and a drilling configuration;
   a clamping sleeve; and
   a chuck body in which clamping jaws are movably guided by a threaded connection,
   wherein the chuck body of the drill chuck is supported on the machine spindle in a rotary fashion,
   wherein, when a sliding sleeve is moved relative to the chuck body between a first position that corresponds to the clamping configuration and a second position that corresponds to the drilling configuration, a flow of force traveling from the motor via the machine spindle to the threaded connection is shifted to a flow of force traveling from the motor via the machine spindle to the chuck body and vice versa, and
   wherein the chuck body has at least one first detent seat corresponding to the clamping configuration and at least one second detent seat corresponding to the drilling configuration, wherein a control cam is arranged between the first and second detent seats, and wherein the clamping sleeve has at least one detent element that corresponds to the detent seats.

2. The drill apparatus according to claim 1, wherein the sliding sleeve is connected to the chuck body in a rotationally fixed fashion and is supported so that the sliding sleeve moves axially relative to the chuck body.

3. The drill apparatus according to claim 1, wherein the sliding sleeve is axially secured to the clamping sleeve and in a first position, is rotationally fixed while in a second position, is supported so that the sliding sleeve is able to rotate relative to the machine housing.

4. The drill apparatus according to claim 2, wherein the sliding sleeve has at least one first indent for producing a rotationally fixed coupling with at least one corresponding first coupling element of the machine housing.

5. The drill apparatus according to claim 2, wherein the sliding sleeve has at least one second indent for producing a rotationally fixed coupling with at least one corresponding second coupling element of the machine spindle.

6. The drill apparatus according to claim 1, wherein a roller bearing or a slide bearing is provided for supporting the chuck body on the machine spindle in a rotary fashion.

7. The drill apparatus according to claim 1, wherein the threaded connection comprises a clamping thread of the clamping jaws, which have round jaws, and a threaded ring that engages with the clamping thread.

8. The drill apparatus according to claim 7, wherein a planetary gear is arranged between the threaded ring and the machine spindle and comprises a ring gear connected to the threaded ring in a rotationally fixed fashion, at least one planet gear arranged in the chuck body in rotary fashion, and a sun gear supported on the machine spindle in a rotationally fixed fashion.

9. The drill apparatus according to claim 1, wherein on a side oriented away from the machine spindle, the clamping sleeve is axially supported by a spring element.

10. The drill apparatus according to claim 9, wherein for axial support of the clamping sleeve, a support ring is provided that is acted on by the spring element.

11. The drill apparatus according to claim 1, wherein on a side of the chuck body oriented away from the machine spindle, a protective cap is provided, which has an annular collar that is recessed at least in a drilling configuration into an annular recess of the clamping sleeve.

12. The drill apparatus according to claim 1, wherein a sensor is provided, which sends a signal to the drilling machine as soon as the clamping sleeve is in the first position.

13. The drill apparatus according to claim 1, wherein at least one spring is provided for adjusting a switching torque.

14. A drill chuck for a drill apparatus that has a machine spindle and is movable between a clamping configuration and a drilling configuration and has a clamping sleeve in a chuck body in which clamping jaws are movably guided by a threaded connection, wherein, when a sliding sleeve is moved relative to the chuck body between a first position that corresponds to the clamping configuration and a second position that corresponds to the drilling configuration, a flow of force traveling from the machine spindle to the threaded connection is shifted to a flow of force traveling from the machine spindle to the chuck body and vice versa, and
   wherein the chuck body has at least one first detent seat corresponding to the clamping configuration and at least one second detent seat corresponding to the drilling configuration, wherein a control cam is arranged between the first and second detent seats, and wherein the clamping sleeve has at least one detent element that corresponds to the detent seats.

15. The drill chuck according to claim 14, wherein an impact mechanism is provided for impact drilling.

* * * * *